United States Patent
Kitano et al.

(10) Patent No.: US 12,350,654 B2
(45) Date of Patent: Jul. 8, 2025

(54) OXYNITRIDE-HYDRIDE, METAL-SUPPORTED MATERIAL CONTAINING OXYNITRIDE-HYDRIDE, AND AMMONIA SYNTHESIS CATALYST

(71) Applicant: JAPAN SCIENCE AND TECHNOLOGY AGENCY, Kawaguchi (JP)

(72) Inventors: Masaaki Kitano, Machida (JP); Hideo Hosono, Yamato (JP); Toshiharu Yokoyama, Yokohama (JP); Jun Kujirai, Niigata (JP); Kiya Ogasawara, Hadano (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 314 days.

(21) Appl. No.: 17/801,816

(22) PCT Filed: Feb. 16, 2021

(86) PCT No.: PCT/JP2021/005767
§ 371 (c)(1),
(2) Date: Jan. 4, 2023

(87) PCT Pub. No.: WO2021/172109
PCT Pub. Date: Sep. 2, 2021

(65) Prior Publication Data
US 2023/0241593 A1    Aug. 3, 2023

(30) Foreign Application Priority Data
Feb. 26, 2020 (JP) ................. 2020-030730

(51) Int. Cl.
*B01J 23/46* (2006.01)
*B01J 23/745* (2006.01)
(Continued)

(52) U.S. Cl.
CPC ............ *B01J 27/24* (2013.01); *B01J 23/462* (2013.01); *B01J 23/745* (2013.01); *B01J 23/75* (2013.01);
(Continued)

(58) Field of Classification Search
CPC ........ B01J 27/24; B01J 23/002; B01J 23/005; B01J 23/462; B01J 23/745; B01J 23/75; B01J 23/755; C01C 1/0411
See application file for complete search history.

(56) References Cited

U.S. PATENT DOCUMENTS 5,766,336 A * 6/1998 Jansen ................ C01B 21/0821
106/467
2017/0073229 A1* 3/2017 Kageyama .............. C30B 31/08
(Continued)

FOREIGN PATENT DOCUMENTS

CN 102744060 A 10/2012
CN 103977828 A 8/2014
(Continued)

OTHER PUBLICATIONS

Machine translation of Sayama (JP63-88417B2), Sep. 12, 2018.*
(Continued)

*Primary Examiner* — Jun Li
(74) *Attorney, Agent, or Firm* — Panitch Schwarze Belisario & Nadel LLP (57) ABSTRACT

The present invention is related to an oxynitride-hydride which is capable of achieving both stabilization and improvement of catalyst performance when used as a support, and the oxynitride-hydride can be easily synthesized. The oxynitride-hydride is represented by the following general formula (1), $$A_n B_m O_{l-x} N_y H_z \qquad (1)$$

(Continued)

wherein in the general formula (1), x represents a number represented by 0.1≤x≤3.5; y represents a number represented by 0.1≤y≤2.0; and z represents a number represented by 0.1≤z≤2.0.

17 Claims, 2 Drawing Sheets (51) Int. Cl.
 B01J 23/75 (2006.01)
 B01J 23/755 (2006.01)
 B01J 27/24 (2006.01)
 B01J 35/30 (2024.01)
 B01J 37/08 (2006.01)
 C01C 1/04 (2006.01)
(52) U.S. Cl.
 CPC ............ *B01J 23/755* (2013.01); *B01J 35/394* (2024.01); *B01J 37/08* (2013.01); *C01C 1/0411* (2013.01)

(56) References Cited

U.S. PATENT DOCUMENTS

| 2017/0088433 A1 | 3/2017 | Kageyama et al. |
| 2022/0048782 A1* | 2/2022 | Kitano ............... B01J 23/745 |

FOREIGN PATENT DOCUMENTS

| CN | 105013519 A | | 11/2015 | |
| CN | 106163658 A | | 11/2016 | |
| CN | 112275291 A | * | 1/2021 | ............ B01J 23/002 |
| GB | 2573125 A | * | 10/2019 | ............ B01J 23/002 |
| IN | 201647029495 A | | 10/2016 | |
| JP | 2004261728 A | | 9/2004 | |
| JP | 2006231229 A | | 9/2006 | |
| JP | 6388417 B2 | * | 9/2018 | |
| WO | 2015136953 A1 | | 9/2015 | |
| WO | 2015136954 A1 | | 9/2015 | |
| WO | WO-2015129471 A1 | * | 9/2015 | ............ B01J 23/462 |
| WO | 2018-213305 A1 | | 11/2018 | |
| WO | WO-2019216304 A1 | * | 11/2019 | ............ B01J 21/10 |
| WO | 2020175558 A1 | | 9/2020 | |

OTHER PUBLICATIONS

International Search Report (PCT/ISA/210) with an English translation, and Written Opinion (PCT/ISA/237) mailed on Apr. 20, 2021, by the Japanese Patent Office as the International Searching Authority for International Application No. PCT/JP2021/005767. (8 pages).
Kitano, Masaaki, et al., "Low-Temperature Synthesis of Perovskite Oxynitride-Hydrides as Ammonia Synthesis Catalysts", Journal of the American Chemical Society, Nov. 22, 2019, vol. 141, pp. 20344-20353, American Chemical Society (ACS) Publications. (10 pages).
Liu, Guo, et al., Synthesis and Magnetic Properties of BaCdLn(O1N)4, Ln=La, Ce, Journal of Solid State Chemistry, Jul. 27, 1990, vol. 89, pp. 366-371, Academic Press, Inc. (6 pages).
Shimoda, Naohiro, et al., "Ammonia synthesis over yttrium-doped barium zirconate and cerate-based perovskite-type oxide supported ruthenium catalysts", International Journal of Hydrogen Energy, Nov. 10, 2017, vol. 42, p. 29745-29755, Elsevier Ltd. (11 pages).
Yang, Xiao-Long, et al., "Low temperature ruthenium catalyst for ammonia synthesis supported on BaCeO3 nanocrystals", Catalysis Communications, Mar. 20, 2010, vol. 11, pp. 867-870, Elsevier B.V. (4 pages).
First Office Action issued on Feb. 22, 2024, by the State Intellectual Property Office of People's Republic of China in corresponding Chinese Patent Application No. 202180012944.9, and an English translation of the Office Action. (20 pages).
Office Action with Search Report issued on Aug. 1, 2024, by the State Intellectual Property Office of People's Republic of China in corresponding Chinese Patent Application No. 202180012944.9, and an English translation of the Search Report. (15 pages).
Wan et al., Research Frontiers of Solid Surface Physical Chemistry, Xiamen University Press, Mar. 2006, pp. 530-535. (8 pages).
Liu et al., Synthesis, Sintering and Application of Magnesium Aluminate Spinel, Metallurgical Industry Press, Jan. 2019, pp. 239-243. (6 pages).

* cited by examiner

OXYNITRIDE-HYDRIDE, METAL-SUPPORTED MATERIAL CONTAINING OXYNITRIDE-HYDRIDE, AND AMMONIA SYNTHESIS CATALYST

TECHNICAL FIELD

The present invention relates to an oxynitride-hydride, a metal-supported material containing an oxynitride-hydride, and an ammonia synthesis catalyst.

This application claims priority to Japanese Patent Application No. 2020-030730 filed on Feb. 26, 2020, the contents of which are incorporated herein by reference.

BACKGROUND

As a typical ammonia synthesis method, the Haber-Bosch process is a method of producing ammonia by directly reacting a mixture of nitrogen and hydrogen with a doubly promoted iron catalyst containing several percent of $Al_2O_3$ and $K_2O$ in $Fe_3O_4$ under high-temperature and high-pressure conditions. This technology is still used industrially in the manufacturing process almost as it was at the time of completion.

On the other hand, a method of synthesizing ammonia at a temperature lower than the reaction temperature of the Haber-Bosch process has been studied. Catalysts capable of synthesizing ammonia by contacting it with nitrogen and hydrogen have been investigated, and transition metals have been examined as their catalytic active components. Among these methods, a method in which a catalyst obtained by supporting ruthenium (Ru), as a catalyst active component, on various supports is used as an ammonia synthesis catalyst has been proposed as an efficient method (for example, Patent Document 1).

Further, a supported-metal catalyst obtained by supporting Ru on an oxynitride-hydride $BaTi(O_{3-z}H_xN_y)$ having a perovskite-type crystal structure or on a metal oxide $BaCeO_3$ having a perovskite-type crystal structure as a support has been reported (for example, Patent Document 2 and Non-Patent Document 1). Further, a supported-metal catalyst ($Ru/BaCe_{1-x}Y_xO_{3-y}$) obtained by supporting Ru on Zr-doped $BaCeO_3$ as a support has been reported (for example, Non-Patent Document 2).

On the other hand, a method of synthesizing nitrogen-doped $BaCeO_3$ (Perovskite oxynitride, $BaCe_2(O, N)_4$) has been reported, but there is no disclosure about using the nitrogen-doped $BaCeO_3$ as an ammonia synthesis catalyst (for example, Non-Patent Document 3).

PATENT DOCUMENTS

[Patent Document 1] Japanese Unexamined Patent Application Publication No. 2006-231229
[Patent Document 2] WO 2015/136953

Non-Patent Documents

[Non-Patent Document 1] Yang, Xiao-Long et al., "Catalyst Communications" 11, p. 867-870 (2010)
[Non-Patent Document 2] Shimoda, Naohiro et al., "International Journal of Hydrogen Energy" 42, p. 29745-29755 (2017)
[Non-Patent Document 3] Liu, Guo et al. "Journal of Solid State Chemistry" 89, p 366-371 (1990)

SUMMARY OF THE INVENTION

Problems to be Solved by Invention

Although the ammonia synthesis by the Haber-Bosch process using a doubly promoted iron catalyst has been put into practical use, it requires a high-temperature and high-pressure conditions. Therefore, there is a problem in that the burden on an apparatus and the cost is high.

The supported-metal catalyst as disclosed in Patent Document 1 uses a carbonaceous support such as activated carbon or an inorganic oxide support. However, the supported metal catalysts have a low reaction activity and have an insufficient performance for practical use. The supported-metal catalysts disclosed in Patent Document 2 and Non-Patent Document 1 have insufficient catalytic activity.

In other words, an ammonia synthesis catalyst having a sufficient reactivity even under a condition of lower temperature and lower pressure than the reaction conditions of the Haber-Bosch process is required.

Means for Solving Problems

The present inventors have found an ammonia synthesis catalyst which can achieve both stabilization and improvement of catalyst performance by supporting a transition metal on a composition containing an oxynitride-hydride.

That is, the subject matter of the present invention is shown as follows:

[1] An oxynitride-hydride, which is represented by the following general formula (1), $$A_nB_mO_{l-x}N_yH_z \quad (1)$$

wherein, in the general formula (1), A is at least one kind selected from the group consisting of Ba and Sr; B is at least one kind selected from the group consisting of Al, Ga, In, Si, Ge, and Sn; n is an integer of 1 to 3; m is 1 or 2; l is 4 or 5; x represents a number represented by $0.1 \leq x \leq 3.5$; y represents a number represented by $0.1 \leq y \leq 2.0$; and z represents a number represented by $0.1 \leq z \leq 2.0$.

[2] The oxynitride-hydride according to [1], wherein, in the general formula (1), B is at least one kind selected from the group consisting of Al, Ga, and In; n=1; m=2; and l=4.

[3] The oxynitride-hydride according to [1], wherein, in the general formula (1), B is at least one kind selected from the group consisting of Si, Ge, and Sn; n=3; m=1; and l=5.

[4] A metal-supported material in which a transition metal (M) is supported on a support, wherein the support is a composition comprising the oxynitride-hydride according to any one of [1] to [3].

[5] The metal-supported material according to [4], wherein a loading amount of the transition metal (M) is 0.01 parts by mass to 50 parts by mass with respect to 100 parts by mass of the support.

[6] The metal-supported material according to [4] or [5], wherein the transition metal (M) is at least one kind selected from the group consisting of Ru, Co, and Fe.

[7] A supported-metal catalyst comprising the metal-supported material according to any one of claims 4 to 6.

[8] An ammonia synthesis catalyst comprising the metal-supported material according to any one of [4] to [6].

[9] An ammonia synthesis catalyst, which is a composition comprising the oxynitride-hydride according to any one of [1] to [3].

[10] A method of producing ammonia, comprising reacting nitrogen with hydrogen in the presence of the supported-metal catalyst according to [7].

[11] A method of producing an oxynitride-hydride represented by the following general formula (1), comprising:
a step of heating a compound represented by the following general formula (2) and a compound represented by the following general formula (3) under an ammonia atmosphere, $$A_nB_mO_{l-x}N_yH_z \quad (1)$$

$$A(NH_2)_2 \quad (2)$$

$$B_kO_j \quad (3)$$

wherein, in the general formulae (1) to (3), A is at least one kind selected from the group consisting of Ba and Sr; B is at least one kind selected from the group consisting of Al, Ga, In, Si, Ge, and Sn; n is an integer of 1 to 3; m is 1 or 2; l is 4 or 5; k is 1 or 2; j is 1 to 3; x represents a number represented by $0.1 \leq x \leq 3.5$; y represents a number represented by $0.1 \leq y \leq 2.0$; and z represents a number represented by $0.1 \leq z \leq 2.0$.

[12] The method of producing the oxynitride-hydride according to [11], wherein, in the general formula (1), B is at least one kind selected from the group consisting of Al, Ga, and In; n=1; m=2; and l=4.

[13] The method of producing the oxynitride-hydride according to [11], wherein, in the general formula (1), B is at least one kind selected from the group consisting of Si, Ge, and Sn; n=3; m=1; and l=5.

Effect of the Invention

When the oxynitride-hydride of the present invention is used as an ammonia synthesis catalyst, it has a high ammonia synthesis activity even at a low reaction temperature and a low reaction pressure, and the catalyst activity does not decrease even if the synthesis reaction is repeated; therefore, the oxynitride-hydride is suitable as an ammonia synthesis catalyst.

Further, in comparison with the conventional synthesis method of oxynitride or oxohydride, the composition containing the oxynitride-hydride of the present invention can be synthesized by a low-temperature heat treatment process, and the synthesis method is also superior in terms of productivity and cost.

DESCRIPTION OF THE INVENTION (Oxynitride-Hydride)

The oxynitride-hydride of the present invention is an oxynitride-hydride in which nitrogen and hydrogen are doped in oxygen sites of a complex oxide represented by the following general formula (5). The oxynitride-hydride of the present invention is a compound represented by the general formula (1). It is preferable that the oxynitride-hydride has the same type of crystal structure as the complex oxide represented by the general formula (5) which is not doped with nitrogen or hydrogen. That is, it is preferable that the oxynitride-hydride of the present embodiment maintains the crystal structure of the complex oxide while nitrogen and hydrogen are doped in the oxygen sites of the complex oxide represented by the general formula (5).

$$A_nB_mO_l \quad (5)$$

In the general formula (5), A is at least one kind selected from the group consisting of Ba and Sr; and B is at least one kind selected from the group consisting of Al, Ga, In, Si, Ge, and Sn.

$$A_nB_mO_{l-x}N_yH_z \quad (1)$$

In the general formula (1), A is at least one kind selected from the group consisting of Ba and Sr; B is at least one kind selected from the group consisting of Al, Ga, In, Si, Ge, and Sn; n is an integer of 1 to 3; m is 1 or 2; l is 4 or 5; x represents a number represented by $0.1 \leq x \leq 3.5$; y represents a number represented by $0.1 \leq y \leq 2.0$; and z represents a number represented by $0.1 \leq z \leq 2.0$.

An amount of nitrogen and an amount of hydrogen doped in the oxynitride-hydride of the present invention are not particularly limited. It is preferable that the resulting oxynitride-hydride can maintain the crystal structure of the complex oxide represented by the general formula (5).

The relationship between x, y, and z is preferably, for example, $2x-(3y+z)=0$, such that the oxynitride-hydride is charge neutral.

In the general formula (1), it is preferable that x represents a number represented by $0.5 \leq x \leq 3.5$; y represents a number represented by $0.25 \leq y \leq 1.8$; and z represents a number represented by $0.25 \leq z \leq 1.8$.

In the general formula (1), it is more preferable that x represents a number represented by $1.0 \leq x \leq 3.4$; y represents a number represented by $1.0 \leq y \leq 1.7$; and z represents a number represented by $1.0 \leq z \leq 1.8$.

The doped nitrogen and hydrogen may be partially further replaced with an atom other than nitrogen and hydrogen, and examples of the atom may specifically include an electron, a carbon atom, a halogen atom, and the like, as long as the effect of the present invention is not impaired.

Specific examples of the oxynitride-hydride of the present invention include an oxynitride-hydride represented by the general formula (1) wherein A is Ba and B is Al; an oxynitride-hydride represented by the general formula (1) wherein A is Ba and B is Ga; an oxynitride-hydride represented by the general formula (1) wherein A is Ba and B is In; an oxynitride-hydride represented by the general formula (1) wherein A is Ba and B is Si; an oxynitride-hydride represented by the general formula (1) wherein A is Ba and B is Ge; an oxynitride-hydride represented by the general formula (1) wherein A is Ba and B is Sn; and an oxynitride-hydride represented by the general formula (1) wherein A is Sr and B is at least one kind selected from the group consisting of Al, Ga, Si, and Ge. Among them, an oxynitride-hydride represented by the general formula (1) wherein A is Ba and B is Al, or an oxynitride-hydride represented by the general formula (1) wherein A is Ba and B is Si is preferable, and an oxynitride-hydride represented by the general formula (1) wherein A is Ba and B is Al is more preferable.

Examples of the oxynitride-hydride represented by the general formula (1) wherein A is Ba and B is Al include $BaAl_2O_{4-x}N_yH_z$, $Ba_3Al_2O_{6-x}N_yH_z$, $Ba_3Al_{17}O_{20-x}N_yH_z$, $Ba_4Al_2O_{7-x}N_yH_z$, $Ba_{17}Al_3O_{7-x}N_yH_z$, $BaAl_4O_{7-x}N_yH_z$, $BaAl_{12}O_{19-x}N_yH_z$, and the like. Among them, $BaAl_2O_{4-x}N_yH_z$ is more preferable.

Examples of the oxynitride-hydride represented by the general formula (1) wherein A is Ba and B is Ga include $BaGa_2O_{4-x}N_yH_z$, $BaGa_4O_{7-x}N_yH_z$, $Ba_4Ga_2O_{7-x}N_yH_z$, $Ba_3Ga_2O_{6-x}N_yH_z$, and the like.

Examples of the oxynitride-hydride represented by the general formula (1) wherein A is Ba and B is In include $BaInO_{2.5-x}N_yH_z$, $Ba_3In_2O_{6-x}N_yH_z$, $Ba_8In_6O_{17-x}N_yH_z$, $Ba_2In_2O_{5-x}N_yH_z$, $Ba_4In_2O_{7-x}N_yH_z$, $Ba_4In_6O_{13-x}N_yH_z$, and the like.

Examples of the oxynitride-hydride represented by the general formula (1) wherein A is Ba and B is Si include $Ba_3SiO_{5-x}N_yH_z$, $Ba_2SiO_{4-x}N_yH_z$, $Ba_2Si_4O_{10-x}N_yH_z$, $Ba_4Si_6O_{16-x}N_yH_z$, $BaSi_4O_{9-x}N_yH_z$, $Ba_5Si_8O_{21-x}N_yH_z$, $Ba_6Si_{10}O_{26-x}N_yH_z$, $BaSiO_{3-x}N_yH_z$, $BaSi_2O_{5-x}N_yH_z$, and the like. Among them, $Ba_3SiO_{5-x}N_yH_z$ is more preferable.

Examples of the oxynitride-hydride represented by the general formula (1) wherein A is Ba and B is Ge include $Ba_3GeO_{1-x}N_yH_z$, $BaGe_4O_{9-x}N_yH_z$, $BaGe_2O_{5-x}N_yH_z$, $Ba_{10}Ge_7O_{3-x}N_yH_z$, $BaGeO_{3-x}N_yH_z$, $Ba_3Ge_3O_{9-x}N_yH_z$, and the like.

Examples of the oxynitride-hydride represented by the general formula (1) wherein A is Ba and B is Sn include $Ba_2SnO_{4-x}N_yH_z$, $BaSnO_{3-x}N_yH_z$, $Ba_3SnO_{1-x}N_yH_z$, and the like.

Examples of the oxynitride-hydride represented by the general formula (1) wherein A is Sr and B is at least one kind selected from the group consisting of Al, Ga, Si, and Ge include $SrAl_2O_{4-x}N_yH_z$, $SrGa_2O_{4-x}N_yH_z$, $Sr_3SiO_{5-x}N_yH_z$, $Sr_3GeO_{5-x}N_yH_z$, and the like.

(Method of Producing Oxynitride-Hydride)

The method of producing an oxynitride-hydride represented by the following general formula (1) includes a step of heating a compound represented by the following general formula (2) and a compound represented by the following general formula (3) under an ammonia atmosphere.

$$A_nB_mO_{l-x}N_yH_z \quad (1)$$

$$A(NH_2)_2 \quad (2)$$

$$B_kO_j \quad (3)$$

In the general formulae (1) to (3), A is at least one kind selected from the group consisting of Ba and Sr; B is at least one kind selected from the group consisting of Al, Ga, In, Si, Ge, and Sn; n is an integer of 1 to 3; m is 1 or 2; l is 4 or 5; k is 1 or 2; j is 1 to 3; x represents a number represented by $0.1 \le x \le 3.5$; y represents a number represented by $0.1 \le y \le 2.0$; and z represents a number represented by $0.1 \le z \le 2.0$.

Preferred embodiments and specific examples of the oxynitride-hydride represented by the general formula (1), which is a product of the producing method of the present invention, are the same as those of the above-mentioned oxynitride-hydride of the present invention.

Examples of the compound represented by the general formula (2), which is a raw material of the producing method of the present invention, include $Ba(NH_2)_2$ and $Sr(NH_2)_2$.

Examples of the compound represented by the general formula (3), which is a raw material of the producing method of the present invention, include $Al_2O_3$, $SiO_2$, $SnO$, $In_2O_3$, $GeO_2$, and the like.

The method of producing the oxynitride-hydride represented by the general formula (1), as an embodiment of the present invention, includes a step of heating a metal amide compound of $Ba(NH_2)_2$ or $Sr(NH_2)_2$ and an oxide of an element represented by B in formula (1) (for example, $Al_2O_3$, $SiO_2$) under an ammonia atmosphere. A detailed producing method will be described in the following embodiments. For example, the method includes a mixing step of mixing the metal amide compound and the oxide, and a heating step of heating the mixture obtained in the mixing step in the ammonia atmosphere. It is preferable to further include a pretreatment step of dehydrating the metal amide compound before the mixing step. In this case, in the mixing step, it is preferable to mix the obtained dehydrated oxide in a rare gas atmosphere such as in an Ar glove box.

An example of the pretreatment step of the dehydration includes a method of vacuum heating treatment at 300° C. or higher and lower than 900° C., preferably at 400° C. or higher and lower than 800° C. and more preferably at 500° C. or higher and lower than 700° C.

An example of the heat treatment includes a method of performing heat treatment in an ammonia stream at 300° C. or higher and lower than 900° C. for 1 to 50 hours, preferably at 300° C. or higher and lower than 900° C. for 2 to 30 hours, and more preferably at 400° C. or higher and lower than 900° C. for 5 to 20 hours.

In the case of producing the compound represented by the general formula (1), as the raw material charging ratio of the oxide to the metal amide compound, the molar ratio (A:B) of the element A to the element B is preferably 0.5×n:m to 1.5×n:m (mol/mol), more preferably 0.8×n:m to 1.2×n:m, and still more preferably 0.9×n:m to 1.1×n:m. Here, A, B, n, and m have the same meaning as A, B, n, and m in the above general formula (1).

A form of the raw material of the metal amide used and a form of the raw material of the oxide are preferably powder. For example, the metal amide is commercially available. The metal amide can be synthesized by the following procedure. Metal A (A is at least one kind selected from the group consisting of Ba and Sr) having a purity of 99.99% is placed in a pressure-resistant container, and ammonia gas is introduced into the container while being cooled to about −50° C. to dissolve the metal A. After stirring at −50° C. for 1 hour, the mixture was returned to room temperature.

Thereafter, the container was immersed in an oil bath, held at 100° C. for 1 hour with stirring, and then was cooled to room temperature. After cooling, ammonia gas remaining in the container is exhausted to obtain the metal amide.

Hereinafter, the oxynitride-hydride of the present invention, a metal-supported material supporting a transition metal, a supported-metal catalyst, and an ammonia synthesis catalyst will be described in detail with reference to first and second embodiments of the present invention. Further, a method of producing ammonia using the ammonia synthesis catalyst and a method of producing an oxynitride-hydride according to the present invention will be described in detail by taking the first and second embodiments of the present invention as examples. However, the present invention is not limited to the above embodiments and may take various forms.

First Embodiment (Oxynitride-Hydride Containing Group 13 Typical Element)

The oxynitride-hydride of the present embodiment is an oxynitride-hydride in which nitrogen and hydrogen are doped in the oxygen site of a complex oxide represented by the following general formula (6). The oxynitride-hydride is a compound represented by the following general formula (7). It is preferable that the oxynitride-hydride has the same type of crystal structure as the complex oxide represented by the general formula (6) which is not doped with nitrogen or hydrogen. That is, it is preferable that the oxynitride-hydride of the present embodiment maintains the crystal structure of the complex oxide while doping nitrogen and hydrogen into the oxygen sites of the complex oxide represented by the following general formula (6).

$$AB_2O_4 \tag{6}$$

$$AB_2O_{4-x}N_yH_z \tag{7}$$

In the general formula (7), B is at least one kind selected from the group consisting of Al, Ga, and In; and A, x, y, and z have the same meaning as A, x, y, and z in the general formula (1).

The compound represented by the general formula (7) is a compound represented by the general formula (1), wherein n is 1; m is 2; l is 4; and B is at least one kind selected from the group consisting of Al, Ga, and In.

An amount of nitrogen and an amount of hydrogen doped in the oxynitride-hydride of the present embodiment are not particularly limited as long as the crystal structure of $AB_2O_4$ can be maintained.

The relationship between x, y, and z is preferably, for example, $2x-(3y+z)=0$, such that the oxynitride-hydride is charge neutral.

In the general formula (7), it is preferable that x represents a number represented by $0.5 \le x \le 1.6$; y represents a number represented by $0.25 \le y \le 0.8$; and z represents a number represented by $0.2 \le z \le 0.8$.

In the general formula (7), it is more preferable that x represents a number represented by $1.0 \le x \le 1.4$; y represents a number represented by $0.4 \le y \le 0.6$; and z represents a number represented by $0.3 \le z \le 0.5$.

For example, in the example described below, an oxynitride-hydride represented by $BaAl_2O_{4-x}N_yH_z$ was synthesized.

The doped nitrogen and hydrogen may be partially further replaced with an atom other than nitrogen and hydrogen, and examples of the atom may specifically include an electron, a carbon atom, a halogen atom, and the like, as long as the effect of the present invention is not impaired.

(Method for Producing Oxynitride-Hydride)

The method of producing the oxynitride-hydride represented by the general formula (7), as in the present embodiment, includes a step of heating a metal amide represented by the following general formula (8) and an oxide of a group 13 element represented by the following general formula (9) under an ammonia atmosphere. A detailed producing method will be described in later examples. The method of producing the oxynitride-hydride $AB_2O_{4-x}N_yH_z$ of the present embodiment includes, for example, a mixing step of mixing $A(NH_2)_2$ and $B_2O_3$, and a heating step of heating the mixture obtained in the mixing step in an ammonia atmosphere. It is preferable that the method further includes a pretreatment step of dehydrating $A(NH_2)_2$ before the mixing step. In this case, in the mixing step, the dehydrated $A(NH_2)_2$ and $B_2O_3$ are preferably mixed in a rare gas atmosphere such as an Ar glove box.

$$A(NH_2)_2 \tag{8}$$

$$B_2O_3 \tag{9}$$

In the general formulae (8) and (9), A and B have the same meaning as A and B in the general formula (7).

An example of the pretreatment step of the dehydration includes a method of vacuum heating treatment at 300° C. or higher and lower than 900° C., preferably at 400° C. or higher and lower than 800° C. and more preferably at 500° C. or higher and lower than 700° C.

An example of the heat treatment includes a method of performing heat treatment in an ammonia stream at 300° C. or higher and lower than 900° C. for 1 to 50 hours, preferably at 400° C. or higher and lower than 900° C. for 2 to 50 hours, and more preferably at 500° C. or higher and lower than 900° C. for 5 to 25 hours.

The molar ratio (A:B) of A to B is preferably 0.8:2.0 to 1.2:2.0 (mol/mol), more preferably 0.9:2.0 to 1.1:2.0, and even more preferably 0.95:2.0 to 1.05:2.0.

A form of the raw material $A(NH_2)_2$ and a form of the raw material $B_2O_3$ to be used are preferably powder. For example, a commercially available $Al_2O_3$ powder (average particle size: 2 to 3 μm) made by Kojundo Chemical Lab. Co., Ltd can be used. $Ba(NH_2)_2$ can be synthesized by the following steps. Metal Ba (made by Aldrich, purity 99.99%) is placed in a pressure vessel, and ammonia gas is introduced into the vessel while cooling to about −50° C. to dissolve the metal Ba. The resulting dissolved substance is stirred at −50° C. for 1 hour and then returned to room temperature. Thereafter, the container containing the obtained dissolved substance was immersed in an oil bath, held at 100° C. for 1 hour with stirring, and then cooled to room temperature. After cooling, ammonia gas remaining in the container was exhausted to obtain $Ba(NH_2)_2$.

The oxynitride-hydride of the present embodiment is preferably an oxynitride-hydride obtained by heating $A(NH_2)_2$ and $B_2O_3$ under an ammonia atmosphere. The oxynitride-hydride obtained by the producing method which includes a mixing step of mixing $A(NH_2)_2$ and $B_2O_3$ and a heating step of heating the mixture obtained by the mixing step in an ammonia atmosphere is more preferable. It is preferable that the method further includes a pretreatment step of dehydrating $B_2O_3$ before the mixing step. In this case, in the mixing step, it is preferable to mix the dehydrated $B_2O_3$ and $A(NH_2)_2$ in a rare gas atmosphere such as an Ar glove box. In addition, a preferable heat treatment temperature, a preferable heating time, a preferable charging ratio of the raw material, and the like are the same as those of the producing method mentioned above.

<Determination of Nitrogen and Hydrogen in Oxynitride-Hydride>

The synthesized oxynitride-hydride $AB_2O_{4-x}N_yH_z$ can be analyzed with a temperature-programmed desorption analyzer (BELCATA) to determine the amount of nitrogen and hydrogen desorbed. Based on the results of the amount of nitrogen and hydrogen desorbed, the percentage of nitrogen and hydrogen contained in the oxynitride-hydride is obtained. For example, in a later example, the composition of $BaAl_2O_{4-x}N_yH_z$ synthesized at 800° C. was $BaAl_2O_{3.7}N_{0.17}H_{0.09}$, based on the results analyzed by the temperature-programmed desorption analysis (BELCATA).

(Metal-Supported Material)

The metal-supported material of the present embodiment is a material in which a transition metal (M) is supported on a support. The support contains an oxynitride-hydride in which nitrogen and hydrogen are doped at the oxygen site of $AB_2O_4$. The metal-supported material of the present embodiment is a material in which a transition metal (M) is supported on a support. The support is a composition containing an oxynitride-hydride represented by the general formula (7). Preferably, the support is a composition containing the oxynitride-hydride of the present embodiment described above. The transition metal (M) is preferably at least one kind selected from the group consisting of Ru, Co. and Fe.

A loading amount of the transition metal is not particularly limited, but is generally, with respect to 100 parts by mass of the support, 0.01 parts by mass (0.01% by mass) or more, preferably 0.5 parts by mass (0.5% by mass) or more, more preferably 1 part by mass (1% by mass) or more, and still more preferably 2 parts by mass (2% by mass) or more; and usually 50 parts by mass (50% by mass) or less, preferably 30 parts by mass (30% by mass) or less, more preferably 20 parts by mass (20% by mass) or less, and still more preferably 10 parts by mass (10% by mass) or less. The effect of the present invention can be obtained if the loading amount is equal to or greater than the lower limit value, and the effect of the present invention commensurate with the loading amount and cost can be obtained if the loading amount is equal to or less than the upper limit value.

The metal-supported material of the present embodiment is a material in which a transition metal (M) is supported on a support. The support is preferably a composition containing an oxynitride-hydride obtained by heating $B_2O_3$ and $A(NH_2)_2$ under an ammonia atmosphere. More preferably, the composition contains an oxynitride-hydride obtained by a producing method including a mixing step of mixing $B_2O_3$ and $A(NH_2)_2$ and a heating step of heating the mixture obtained by the mixing step in an ammonia atmosphere. It is preferable that the method further includes a pretreatment step of dehydrating $B_2O_3$ before the mixing step. In this case, in the mixing step, it is preferable to mix the dehydrated $B_2O_3$ and $A(NH_2)_2$ in a rare gas atmosphere such as an Ar glove box. In addition, a preferable heat treatment temperature, a preferable heating time, a preferable charging ratio of the raw material, and the like are the same as those of the producing method.

<Transition Metal>

As the transition metal used in the present embodiment, it is not particularly limited, but transition metals from Groups 6, 7, 8, 9, or 10 of the periodic table may be used, preferably those from Groups 6, 8, or 9 may be used, and more preferably those from Groups 8 or 9 may be used.

As the specific metal element, it is not particularly limited, but Cr, Mo, Mn, Re, Fe, Ru, Os, Co, Rh, Ni, Pd, or Pt may be used. Mo, Re, Fe, Ru, Os, or Co may be preferably used in view of high bonding energy with nitrogen. Ru, Co, or Fe may be more preferably used in view of catalytic activity on synthesizing ammonia when the supported metal material is used as a supported metal catalyst. Further, Ru may be most preferably used in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$, and the like may also be used. Each element may be used alone or in combination of two or more kinds; and preferably, each element may be used alone in view of cost.

<Method of Loading Transition Metal (M) on Oxynitride-Hydride>

A method of loading the transition metal (M) on the oxynitride-hydride is not particularly limited, but, for example, the powdered oxynitride-hydride ($AB_2O_{4-x}N_yH_z$) obtained by the above method and a compound of the metal to be supported are inserted into a silica glass tube, heated in vacuum at 50° C. to 90° C. for 0.5 to 4 hours, and then heated at 100° C. to 150° C. for 0.5 to 4 hours to adhere the metal compound on the surface of the powdered $AB_2O_{4-x}N_yH_z$. Finally, the metal compound is thermally decomposed by heating at 150° C. to 300° C. for 0.5 to 5 hours to obtain a supported material in which the transition metal (M) is fixed on $AB_2O_{4-x}N_yH_z$ (hereinafter, referred to as $M/AB_2O_{4-x}N_yH_z$).

For example, the transition metal compounds $Ru_3(CO)_{12}$, $Co_2(CO)_8$, and $Fe_2(CO)_9$ in which the transition metal (M) is Ru, Co, and Fe, respectively, can be used to synthesize the metal-supported materials of Ru-supported $AB_2O_{4-x}N_yH_z$ (hereinafter, referred to as $Ru/AB_2O_{4-x}N_yH_z$), Co-supported $AB_2O_{4-x}N_yH_z$ (hereinafter, referred to as $Co/AB_2O_{4-x}N_yH_z$), and Fe-supported $AB_2O_{4-x}N_yH_z$ (hereinafter, referred to as $Fe/AB_2O_{4-x}N_yH_z$).

<Shape of Metal-Supported Material>

A shape of the metal-supported material according to the present embodiment is not particularly limited, and specifically, may be any shape such as a block shape, a powder shape, a film shape, etc., but is usually a powder shape. The particle size of the powdered metal-supported material is not particularly limited, but is usually 1 nm or more and 10 μm or less.

The particle size of the transition metal on the metal-supported material of the present embodiment is not particularly limited, but is generally 1 nm or more and 100 nm or less. Preferably, it is 20 nm or less, and more preferably 10 nm or less, which is advantageous in that the number of step sites, which are active sites for nitrogen dissociation, increases when used as an ammonia synthesis catalyst.

(Metal-Supported Catalyst)

The supported-metal catalyst of the present embodiment contains the metal-supported material. The supported-metal catalyst of the present embodiment contains a transition metal and a support for supporting the transition metal, and the support is a composition containing the oxynitride-hydride represented by the following general formula (7).

$$AB_2O_{4-x}N_yH_z \qquad (7)$$

In the general formula (7), A is at least one kind selected from the group consisting of Ba and Sr; B is at least one kind selected from the group consisting of Al, Ga, and In; x represents a number represented by $0.2 \leq x \leq 2.0$; y represents a number represented by $0.1 \leq y \leq 1.0$; and z represents a number represented by $0.1 \leq z \leq 1.0$.

(Ammonia Synthesis Catalyst)

An ammonia synthesis catalyst is obtained by loading a transition metal (M) on a support. The support is a composition containing an oxynitride-hydride in which nitrogen and hydrogen are doped at the oxygen site of $AB_2O_4$. The ammonia synthesis catalyst of the present embodiment includes a transition metal and a support for supporting the transition metal, and the support is a composition containing an oxynitride-hydride represented by the following general formula (7). Preferably, the support is a composition containing the oxynitride-hydride of the present embodiment described above.

$$AB_2O_{4-x}N_yH_z \qquad (7)$$

In the formula (7), A is at least one kind selected from the group consisting of Ba and Sr; B is at least one kind selected from the group consisting of Al, Ga, and In; x represents a number represented by 0.2≤x≤2.0; y represents a number represented by 0.1≤y≤1.0; and z represents a number represented by 0.1≤z≤1.0.

As long as the effect of the present invention is not impaired, a part of the nitrogen and hydrogen may further include an atom other than both nitrogen and hydrogen, and specifically, examples of the atom may include an electron, a carbon atom, a halogen atom, and the like.

<Transition Metal>

As the transition metal used in the present embodiment, it is not particularly limited, but transition metals from Groups 6, 7, 8, 9, or 10 of the periodic table may be used, preferably those from Groups 6, 8, or 9 may be used, and more preferably those from Groups 8 or 9 may be used.

As the specific metal element, it is not particularly limited, but Cr, Mo, Mn, Re, Fe, Ru, Os, Co, Rh, Ni, Pd, or Pt may be used. Mo, Re, Fe, Ru, Os, or Co may be preferably used in view of high bonding energy with nitrogen. Ru, Co, or Fe may be more preferably used in view of catalytic activity on synthesizing ammonia when the supported metal material is used as a supported metal catalyst. Further, Ru may be most preferably used in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$, and the like may also be used. Each element may be used alone or in combination of two or more kinds; and preferably, each element may be used alone in view of cost.

(Method of Producing Ammonia Synthesis Catalyst)

The ammonia synthesis catalyst of the present invention is obtained by loading a transition metal (M) on a support. The support is a composition containing an oxynitride-hydride in which nitrogen and hydrogen are doped at the oxygen site of $AB_2O_4$. The ammonia synthesis catalyst of the present embodiment is produced by loading the transition metal on the support containing the composition containing the oxynitride-hydride. The producing method is not particularly limited, but generally, the ammonia synthesis catalyst is produced by loading a transition metal or a compound serving as a precursor of the transition metal (hereinafter, transition metal compound) on the support.

The composition of oxynitride-hydride used as the raw material for the ammonia synthesis catalyst of the present embodiment may be a commercially available reagent or an industrial raw material, or may be obtained by a known method from a corresponding metal.

The oxynitride-hydride composition used in the present embodiment can be pretreated by heating at about 200° C. to 500° C. for several hours in a hydrogen atmosphere, for example, at 340° C. for 2 hours, and then the transition metal can be supported at a transition metal-loading step described later.

The catalyst produced by using a material in which the support is previously heated under a hydrogen atmosphere, for example, when used for an ammonia synthesis reaction, can obtain high activity immediately after start of the reaction.

The method of loading the transition metal (M) on the support used in the present embodiment is not particularly limited, and a known method can be used. Generally, a method is used in which a compound of the transition metal to be supported, which can be converted into a transition metal by reduction, thermal decomposition, or the like, is supported on the support, and then the compound is converted into the transition metal.

As the transition metal compound, it is not particularly limited, but an inorganic compound or an organic transition metal complex of a transition metal easily susceptible to thermal decomposition or the like may be used. Specifically, a complex of transition metal, an oxide of transition metal, a transition metal salt such as a nitrate and a hydrochloride, or the like may be used.

For example, as a Ru compound, triruthenium dodecycarbonyl[$Ru_3(CO)_{12}$], dichloro tetrakis (triphenylphosphine) ruthenium (II) [$RuCl_2(PPh_3)_4$], dichloro-tris (triphenylphosphine) ruthenium (II) [$RuCl_2(PPh_3)_3$], tis (acetylacetonato) ruthenium (III) [$Ru(acac)_3$], ruthenocene [$Ru(C_5H_5)$], nitrosyl ruthenium nitrate [$Ru(NO)(NO_3)_3$], potassium ruthenate, ruthenium oxide, ruthenium nitrate, ruthenium chloride, or the like may be used. Tris (acetylacetonato) ruthenium (III) [$Ru(acac)_3$] is preferable.

As an Fe compound, iron pentacarbonyl [$Fe(CO)_5$], dodecycarbonyl ferric [$Fe_3(CO)_{12}$], nona carbonyl iron [$Fe_2(CO)_9$], tetracarbonyl iron iodide [$Fe(CO)_4I_2$], tris (acetylacetonato) iron (III) [$Fe(acac)_3$], ferrocene [$Fe(C_5H_5)_2$], iron oxide, iron nitrate, iron chloride($FeCl_3$), etc.), or the like may be used.

As a Co compound, cobalt octacarbonyl [$Co_2(CO)_8$], tris (acetylacetonato) cobalt (III) [$Co(acac)_3$], cobalt (II) acetylacetonate [$Co(acac)_2$], cobaltocene [$Co(C_5H_5)_2$], cobalt oxide, cobalt nitrate, cobalt chloride, or the like may be used.

A carbonyl complex of a transition metal such as [$Ru_3(CO)_{12}$], [$Fe(CO)_5$], [$Fe_3(CO)_{12}$], [$Fe_2(CO)_9$], or [$Co_2(CO)_8$] among these transition metal compounds is preferable from the viewpoint that the reduction treatment to be described later can be omitted in the production of the supported metal material of the present embodiment because the transition metal may be loaded by loading the carbonyl complex and then heating it.

An amount of the transition metal compound to be used is not particularly limited, and an amount for realizing a desired loading amount can be appropriately used. Usually, with respect to 100 parts by mass of the support, 0.01 parts by mass (0.01% by mass) or more, preferably 2 parts by mass (2% by mass) or more, more preferably 10 parts by mass (10% by mass) or more, and still more preferably 20 parts by mass (20% by mass) or more; and usually 50 parts by mass (50% by mass) or less, preferably 40 parts by mass (40% by mass) or less, and more preferably 30 parts by mass (30% by mass) or less can be used.

As the method of loading the transition metal compound on the catalysis support, for example, a physical mixing method, a CVD method (chemical vapor deposition method), a sputtering method, or the like can be used.

In the physical mixing method, the support and the transition metal compound are mixed in a solid state and then heated in an inert gas stream such as nitrogen, argon, or helium or under vacuum. A heating temperature at this time is not particularly limited, but is usually 200° C. or higher and 600° C. or lower. A heating time is not particularly limited, but usually 2 hours or more is desirable.

When a transition metal compound which may be converted to a transition metal by thermal decomposition is used, at this stage, a transition metal is loaded, and it becomes the ammonia synthesis catalyst of the present embodiment.

In the case of using a transition metal compound other than the above-mentioned transition metal compound which may be converted to a transition metal by thermal decomposition, the transition metal compound may be generally reduced to obtain the supported metal material of the present embodiment.

A method of reducing the transition metal compound (hereinafter, referred to as "reduction treatment") is not particularly limited as long as it does not disturb the object of the present invention, and examples thereof include a method in which the transition metal compound is reduced in a gas atmosphere containing a reducing gas, and a method in which a reducing agent such as $NaBH_4$, $NH_2NH_2$, or formalin is added to the solution of the transition metal compound to precipitate the transition metal on the surface of the metal hydride. However, the method in which the transition metal compound is reduced in a gas atmosphere containing a reducing gas is preferable. Examples of the reducing gas include hydrogen, ammonia, methanol (vapor), ethanol (vapor), methane, ethane, and the like.

During the reduction treatment, a component other than the reducing gas which does not inhibit the object of the present invention, particularly the ammonia synthesis reaction, may coexist with the reaction system. Specifically, at the time of the reduction treatment, in addition to the reducing gas such as hydrogen, a gas such as argon or nitrogen which does not inhibit the reaction may be allowed to coexist, and nitrogen is preferably allowed to coexist.

When the reduction treatment is carried out in a gas containing hydrogen, it can be carried out in parallel with the production of ammonia to be described later by allowing nitrogen to coexist with hydrogen. That is, when the supported metal material of the present embodiment is used as an ammonia synthesis catalyst described later, by placing the transition metal compound supported on the metal hydride in the reaction conditions of the ammonia synthesis reaction, the transition metal compound may be reduced and converted to the transition metal.

The temperature in the reduction treatment is not particularly limited, but is usually 200° C. or higher, preferably 300° C. or higher, and preferably lower than 700° C. More preferably, the temperature is 400° C. or higher and lower than 700° C. This is because the growth of the transition metal is sufficiently and preferably carried out within the reduction treatment temperature range.

A pressure during the reduction treatment is not particularly limited, but it may be 0.01 MPa to 10 MPa. When the pressure during the reduction treatment is set to the same condition as the ammonia synthesis condition described later, since complicated operations are unnecessary, the pressure range is preferable in view of production efficiency.

A time of the reduction treatment is not particularly limited, but in the case where the reduction treatment is carried out under normal pressure, it may be 1 hour or more, and preferably 2 hours or more.

When the reaction is carried out at a high reaction pressure, for example, 1 MPa or more, it is preferable that the reaction is carried out for 1 hour or more.

When a transition metal compound other than a transition metal compound converted to a transition metal by thermal decomposition is used, the transition metal compound contained in the solid mixture is reduced by a normal method, as in the aforementioned reduction treatment method, thereby providing the ammonia synthesis catalyst of the present embodiment.

As components other than the oxynitride-hydride and the transition metal, the ammonia synthesis catalyst may further contain $SiO_2$, $Al_2O_3$, $ZrO_2$, MgO, activated carbon, graphite. SiC, or the like, which are used as a support of the oxynitride-hydride.

The ammonia synthesis catalyst of the present embodiment can be used as a molded body using a conventional molding technique. As a shape of the catalyst, for example, a shape such as granular, spherical, tablet, ring, macaroni, four leaves, dice, honeycomb, and the like can be used. It can also be used after coating a suitable support.

When the ammonia synthesis catalyst of the present embodiment is used, the reaction activity is not particularly limited, but when the formation rate of ammonia at a reaction temperature of 300° C. and a reaction pressure of 0.9 MPa is taken as an example, the reaction activity is preferably 1.0 mmol/g·h or more; more preferably 2.0 mmol/g·h or more because it is suitable for practical production conditions; still more preferably 3.0 mmol/g·h or more because it is suitable for high-efficiency production conditions; and most preferably 5.0 mmol/g·h or more because it is more suitable for high-efficiency production conditions.

A method of producing ammonia using the ammonia synthesis catalyst of the present embodiment will be described below.

(Method for Producing Ammonia)

The method of producing ammonia of the present embodiment (hereinafter, referred to as the producing method of the present embodiment) is a method of synthesizing ammonia by reacting hydrogen and nitrogen on the catalyst using the supported-metal catalyst of the present embodiment or the ammonia synthesis catalyst of the present embodiment as a catalyst.

As a specific producing method, it is not particularly limited, and ammonia can be appropriately synthesized according to a known synthesis method, as long as ammonia is synthesized by bringing hydrogen and nitrogen into contact with the catalyst.

In the method of producing ammonia according to the present embodiment, when hydrogen and nitrogen are brought into contact with the catalyst, the catalyst is heated to produce ammonia.

The reaction temperature in the producing method of the present embodiment is not particularly limited, but is usually 200° C. or higher, preferably 250° C. or higher, and more preferably 300° C. or higher; and usually 600° C. or lower, preferably 500° C. or lower, and more preferably 450° C. or lower. Since ammonia synthesis is an exothermic reaction, the low temperature region is more advantageous for ammonia formation in terms of chemical equilibrium, but it is preferable to carry out the reaction in the above temperature range in order to obtain a sufficient ammonia formation rate.

In the producing method of the present embodiment, the molar ratio of nitrogen and hydrogen brought into contact with the catalyst is not particularly limited, but usually the ratio of hydrogen to nitrogen ($H_2/N_2$ (volume/volume)) is 0.4 or more, preferably 0.5 or more, and more preferably 1 or more; and usually 10 or less, and preferably 5 or less.

The reaction pressure in the producing method of the present embodiment is not particularly limited, but is usually 0.01 MPa or more, and preferably 0.1 MPa or more; and usually 20 MPa or less, preferably 15 MPa or less, and more preferably 10 MPa or less at the pressure of the mixed gas containing nitrogen and hydrogen. For practical use, the reaction is preferably carried out under a pressurized condition of atmospheric pressure or higher.

In the producing method of the present embodiment, it is preferable to remove water or oxide adhering to the catalyst by using a dehydrating material, a cryogenic separation method, or hydrogen gas before bringing nitrogen and hydrogen into contact with the catalyst. As the removal method, a reduction treatment can be used.

In the producing method of the present embodiment, in order to obtain a better ammonia yield, it is not particularly limited, but the water content in nitrogen and the water content in hydrogen used in the synthesis method of the present embodiment are preferably small, and the total water content in the mixed gas of nitrogen and hydrogen is usually preferably 100 ppm or less, and preferably 50 ppm or less.

In the producing method of the present embodiment, the type of the reaction vessel is not particularly limited, and a reaction vessel which can be normally used for the ammonia synthesis reaction can be used. As a specific reaction form, for example, a batch type reaction form, a closed circulation system reaction form, a flow system reaction form, and the like can be used. From a practical viewpoint, a flow system reaction form is preferable. Any one of the following methods such as a method of using a single reactor filled with a catalyst, a method of connecting a plurality of reactors filled with a catalyst, or a method of using a reactor having a plurality of reaction layers in the same reactor can be used.

Since the reaction for synthesizing ammonia from hydrogen and nitrogen is an exothermic reaction accompanied by volumetric shrinkage, reaction heat is preferably removed industrially in order to increase the ammonia yield, and a known reactor with a commonly used heat removal means may be used. For example, a method in which a plurality of reactors filled with a catalyst are connected in series and an intercooler is installed at an outlet of each reactor to remove heat may be used.

In the ammonia production method of the present embodiment, the ammonia synthesis catalyst obtained in the producing method of the present embodiment may be used alone, or the ammonia synthesis catalyst can be used in combination with other known catalysts that can normally be used for ammonia synthesis.

Second Embodiment (Oxynitride-Hydrides Containing Group 14 Typical Element)

The oxynitride-hydride of the present embodiment is an oxynitride-hydride in which nitrogen and hydrogen are doped in the oxygen site of a complex oxide represented by the following general formula (10). The oxynitride-hydride is a compound represented by the following general formula (11). It is preferable that the oxynitride-hydride has the same type of crystal structure as the complex oxide represented by the following general formula (10) which is not doped with nitrogen or hydrogen. That is, it is preferable that the oxynitride-hydride of the present embodiment maintains the crystal structure of the complex oxide while nitrogen and hydrogen are doped into the oxygen site of the complex oxide represented by the following general formula (10).

$$A_3BO_5 \quad (10)$$

$$A_3BO_{5-x}N_yH_z \quad (11)$$

In the general formula (7), B is at least one kind selected from the group consisting of Si, Ge, and Sn; and A, x, y, and z have the same meaning as A, x, y, and z in the general formula (1).

The compound represented by the general formula (11) is a compound represented by the general formula (1), wherein n is 3, m is 1, l is 5, and B is at least one kind selected from the group consisting of Si, Ge, and Sn.

An amount of nitrogen and an amount of hydrogen doped in the oxynitride-hydride of the present embodiment are not particularly limited as long as the crystal structure of $A_3BO_5$ can be maintained.

The relationship between x, y, and z is preferably, for example, $2x-(3y+z)=0$, such that the oxynitride-hydride is charge neutral.

In the general formula (11), it is preferable that x represents a number represented by $0.1 \leq x \leq 3.5$; y represents a number represented by $0.1 \leq y \leq 2.0$; and z represents a number represented by $0.1 \leq z \leq 2.0$.

In the general formula (11), it is more preferable that x represents a number represented by $2.0 \leq x \leq 3.5$; y represents a number represented by $1.0 \leq y \leq 2.0$; and z represents a number represented by $1.0 \leq z \leq 2.0$.

For example, an oxynitride-hydride represented by $Ba_3SiO_{5-x}N_yH_z$ was synthesized in a later example.

The doped nitrogen and hydrogen may be partially replaced with an atom other than both nitrogen and hydrogen as long as the effect of the present invention is not impaired, and examples of the atom may include an electron, a carbon atom, a halogen atom, and the like.

(Method for Producing Oxynitride-Hydrides)

The method of producing the oxynitride-hydride represented by the general formula (11) includes a step of heating a metal amide represented by the general formula (8) and an oxide of a group 14 element represented by the general formula (12) under an ammonia atmosphere. A detailed producing method will be described in a later example. The method of producing the oxynitride-hydride $A_3BO_{5-x}N_yH_z$ of the present embodiment includes, for example, a mixing step of mixing $A(NH_2)_2$ and $BO_2$, and a heating step of heating the mixture obtained in the mixing step in an ammonia atmosphere. It is preferable that the method further includes a pretreatment step of dehydrating $A(NH_2)_2$ before the mixing step. In this case, in the mixing step, the dehydrated $A(NH_2)_2$ and $BO_2$ are preferably mixed in a rare gas atmosphere such as an Ar glove box.

$$A(NH_2)_2 \quad (8)$$

$$BO_2 \quad (12)$$

In the above general formulae (8) and (12), A and B have the same meaning as A and B in the above general formula (11).

As the dehydration treatment step, for example, there is a method of vacuum heating treatment at 300° C. or higher and lower than 900° C., preferably at 400° C. or higher and lower than 800° C., and more preferably at 500° C. or higher and lower than 700° C.

As the heat treatment, for example, there is a method of performing heat treatment in an ammonia stream at 300° C. or higher and lower than 900° C. for 1 to 24 hours, preferably at 300° C. or higher and lower than 700° C. for 2 to 12 hours, and more preferably at 400° C. or higher and lower than 700° C. for 2 to 6 hours.

The molar ratio (A:B) of A to B is preferably 2.4:1 to 3.6:1 (mol/mol), more preferably 2.7:1 to 3.3:1, and even more preferably 2.85:1 to 3.15:1.

The form of the raw material $A(NH_2)_2$ used and the form of the raw material $BO_2$ are preferably powder. Examples include commercially available $SiO_2$ powders (average particle size: less than 10 nm) manufactured by Aldrich. $Ba(NH_2)_2$ can be produced in the same manner as in the first embodiment.

The oxynitride-hydride of the present embodiment is preferably an oxynitride-hydride obtained by heating $A(NH_2)_2$ and $BO_2$ under an ammonia atmosphere. The oxynitride-hydride obtained by the producing method including a mixing step of mixing $A(NH_2)_2$ and $BO_2$ and a heating step of heating the mixture obtained by the mixing step in an ammonia atmosphere is more preferable. It is preferable that the method further includes a pretreatment step of dehydrating $BO_2$ before the mixing step. In this case, in the mixing step, the dehydrated $A(NH_2)_2$ and $BO_2$ are preferably mixed in a rare gas atmosphere such as an Ar glove box. In addition, a preferable heat treatment temperature, a preferable heating time, a preferable charging ratio of the raw material, and the like are the same as those of the above-mentioned producing method.

<Determination of Nitrogen and Hydrogen in Oxynitride-Hydride>

The synthesized oxynitride-hydride $A_3BO_{5-x}N_yH_z$ can be analyzed with a temperature-programmed desorption analyzer (BELCATA) to determine the amount of desorbed nitrogen and hydrogen. With respect to the results of the amount of nitrogen and hydrogen desorbed, the percentage of nitrogen and hydrogen contained in the oxynitride-hydride is obtained. For example, in a later example, the composition of $A_3BO_{5-x}N_yH_z$ synthesized at 600° C. was $A_3BO_{1.62}N_{1.66}H_{1.77}$, based on the results analyzed by a temperature-programmed desorption analyzer (BELCATA).

(Metal-Supported Material)

The metal-supported material of the present embodiment is a supported material in which a transition metal (M) is supported on a support. The support is a composition containing an oxynitride-hydride in which nitrogen and hydrogen are doped in the oxygen site of $A_3BO_5$. The support is a composition containing an oxynitride-hydride represented by the general formula (11). Preferably, the support is a composition containing the oxynitride-hydride of the present embodiment described above. The transition metal (M) is preferably at least one kind selected from the group consisting of Ru, Co, and Fe.

The type of the transition metal, the method of supporting the transition metal (M) on the oxynitride-hydride, the loading amount of the transition metal (M), the method of producing the metal-supported material, and the shape of the metal-supported material are the same as those of the first embodiment.

(Metal-Supported Catalyst)

The supported-metal catalyst of the present embodiment comprises the metal-supported material. The supported-metal catalyst of the present embodiment contains a transition metal and a support for supporting the transition metal, and the support is a composition containing an oxynitride-hydride represented by the general formula (11).

$$A_3BO_{5-x}N_yH_z \quad (11)$$

In the general formula (11), A is at least one kind selected from the group consisting of Ba and Sr; B is at least one kind selected from the group consisting of Si, Ge, and Sn; x represents a number represented by $0.1 \le x \le 3.5$; y represents a number represented by $0.1 \le y \le 2.0$; and z represents a number represented by $0.1 \le z \le 2.0$.

(Ammonia Synthesis Catalyst)

The ammonia synthesis catalyst is obtained by loading a transition metal (M) on a support. The support is a composition containing an oxynitride-hydride in which nitrogen and hydrogen are doped in the oxygen site of $A_3BO_5$. The ammonia synthesis catalyst of the present embodiment includes a transition metal and a support for supporting the transition metal, and the support is a composition containing an oxynitride-hydride represented by the general formula (11). Preferably, the support is a composition containing the oxynitride-hydride of the present embodiment described above.

$$A_3BO_{5-x}N_yH_z \quad (11)$$

In the general formula (11), A is at least one kind selected from the group consisting of Ba and Sr; B is at least one kind selected from the group consisting of Si, Ge, and Sn; x represents a number represented by $0.1 \le x \le 3.5$; y represents a number represented by $0.1 \le y \le 2.0$; and z represents a number represented by $0.1 \le z \le 2.0$.

The nitrogen and hydrogen may further include an atom other than both nitrogen and hydrogen, and examples of the atom may include an electron, a carbon atom, a halogen atom, and the like, as long as the effect of the present invention is not impaired.

The transition metal used in the present embodiment is the same as that of the first embodiment.

(Method of Producing Ammonia Synthesis Catalyst)

The ammonia synthesis catalyst according to the present embodiment is obtained by loading a transition metal (M) on a support. The support is a composition containing an oxynitride-hydride in which nitrogen and hydrogen are doped in the oxygen site of $A_3BO_5$. The ammonia synthesis catalyst of the present embodiment is produced by loading the transition metal on the support containing the composition containing the oxynitride-hydride. The producing method is not particularly limited, but generally, the ammonia synthesis catalyst is produced by loading the transition metal or a compound used as a precursor of the transition metal (hereinafter, referred to as transition metal compound) on the support.

The ammonia synthesis catalyst of the present embodiment can be produced by the same method as the first embodiment.

As components other than the oxynitride-hydride and the transition metal, the ammonia synthesis catalyst may further include $SiO_2$, $Al_2O_3$, $ZrO_2$, MgO, activated carbon, graphite, SiC, or the like, which are used as a support of the oxynitride-hydride.

The ammonia synthesis catalyst of the present embodiment can be used as a molded body using a conventional molding technique. As a shape of the catalyst, for example, a shape such as granular, spherical, tablet, ring, macaroni, four leaves, dice, honeycomb, and the like can be used. It can also be used after coating a suitable support.

When the ammonia synthesis catalyst of the present embodiment is used, the reaction activity is not particularly limited, but when the formation rate of ammonia at a reaction temperature of 300° C. and a reaction pressure of 0.9 MPa is taken as an example, the reaction activity is preferably 1.0 mmol/g·h or more, more preferably 2.0 mmol/g·h or more because it is suitable for practical production conditions, still more preferably 3.0 mmol/g·h or more because it is suitable for high-efficiency production conditions, and most preferably 5.0 mmol/g·h or more because it is more suitable for high-efficiency production conditions.

(Method for Producing Ammonia)

The method of producing ammonia of the present embodiment is the same as the method of producing ammonia of the first embodiment except that the ammonia synthesis catalyst of the present embodiment is used.

In the ammonia production method of the present embodiment, the ammonia synthesis catalyst obtained in the producing method of the present embodiment may be used alone, or the ammonia synthesis catalyst can be used in combination with other known catalysts that can normally be used for ammonia synthesis.

EXAMPLES

The present invention will now be described in more detail with reference to examples. The ammonia synthesis activity was evaluated by obtaining the ammonia formation rate by determining the amount of generated $NH_3$ by a gas chromatograph or by determining the amount of generated $NH_3$ dissolved in an aqueous sulfuric acid solution by an ion chromatograph.

(Ion Chromatogram Analysis)

Ammonia gas discharged from the reaction vessel was dissolved in 5 mM sulfuric acid aqueous solution, and captured ammonium ions ($NH_4^+$) were analyzed by an ion chromatograph. The analytical conditions were shown as follows.

[Measurement Conditions]

Equipment: Prominence manufactured by Shimadzu Corporation

Detector: Electrical conductivity detector CDD-10 Avp (manufactured by Shimadzu Corporation)

Column: Column IC-C4 for ion chromatography (manufactured by Shimadzu Corporation)

Eluent: 3.0 mM oxalic acid+2.0 mM 18-crown-6-ether aqueous solution; flow rate: 1.0 mL/min Column temperature: 40° C.

Example 1

(Preparation of Ammonia Synthesis Catalyst)

[Synthesis of $BaAl_2O_{4-x}N_yH_z$ Powder]

Dehydrated $Al_2O_3$ was obtained by removing water and the like adsorbed on the surface of the $Al_2O_3$ by vacuum heating treatment of $Al_2O_3$ at 600° C., and the obtained dehydrated $Al_2O_3$ and $Ba(NH_2)_2$ were mixed using an agate mortar in an Ar glove box. At this time, the mixture was mixed so that the molar ratio of Ba to Al was 1:2. The obtained powder was heated to 800° C. for 2 hours, and was heat-treated at 800° C. for 20 hours in an $NH_3$ stream having a flow rate of 100 mL/min to obtain a $BaAl_2O_{4-x}N_yH_z$ powder of the present example.

Figure 1:
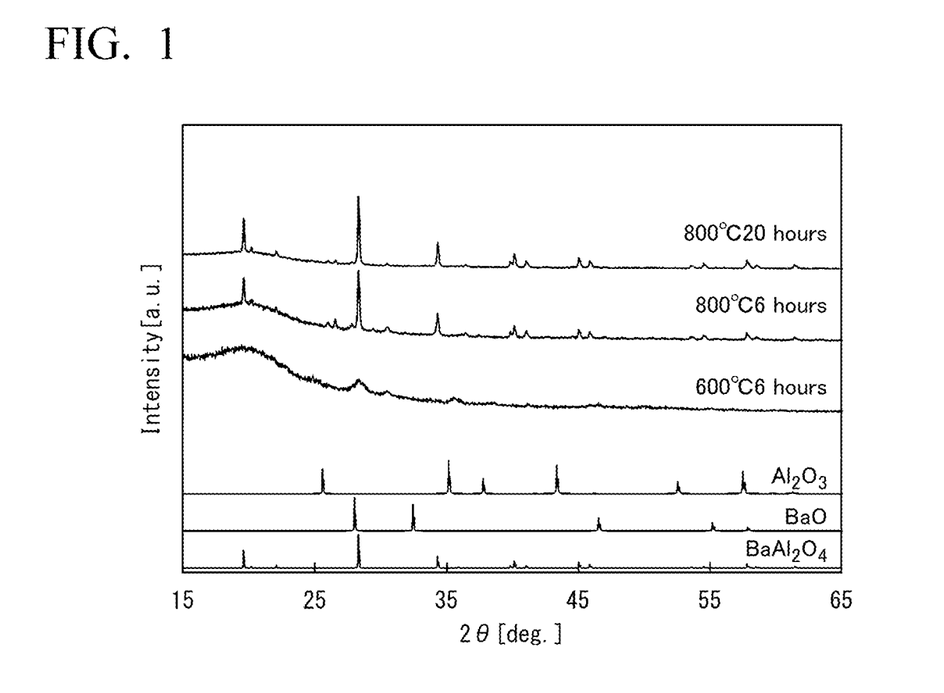
FIG. 1 is XRD patterns of oxynitride-hydride $BaAl_2O_{4-x}N_yH_z$ powders synthesized at various heat treatment temperatures and treatment times as powder treatment conditions in Example 1.

As shown in FIG. 1, when the synthesis was carried out at 600° C. for 6 hours, the desired $BaAl_2O_4$ phase was not obtained. On the other hand, when the synthesis was carried out at 800° C. for 6 hours, the existence of the desired $BaAl_2O_4$ phase was confirmed. Furthermore, in the present example in which the synthesis was carried out at 800° C. for 20 hours, a $BaAl_2O_4$ phase having substantially a single phase was obtained.

<Determining Amount of Nitrogen and Hydrogen in $BaAl_2O_{4-x}N_yH_z$>

Figure 2:
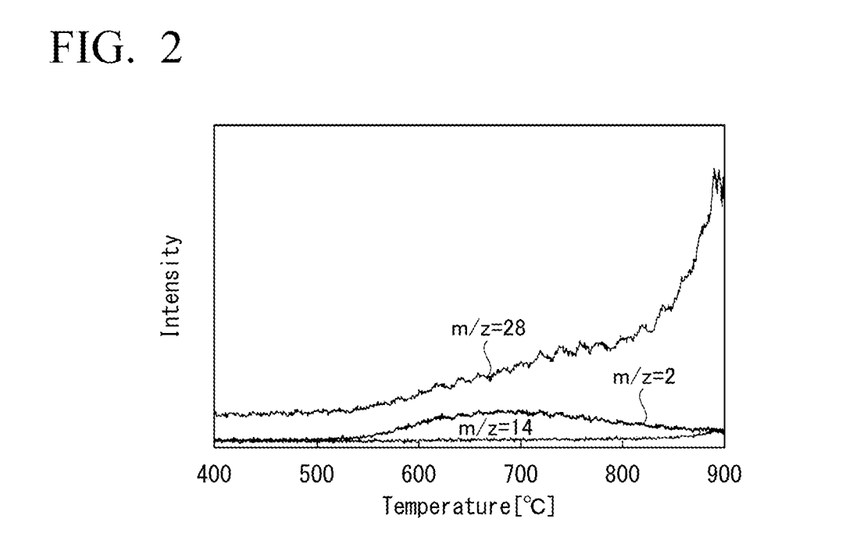
FIG. 2 is a thermal desorption spectrum of $BaAl_2O_{4-x}N_yH_z$ obtained in Example 1.

FIG. 2 shows the result of analyzing $BaAl_2O_{4-x}N_yH_z$ synthesized in the present example by a temperature-programmed desorption analyzer (BELCATA).

As shown in FIG. 2, nitrogen and hydrogen began to desorb from around 550° C., and it was confirmed that nitrogen and hydrogen were contained in $BaAl_2O_{4-x}N_yH_z$. Since nitrogen is not completely desorbed even at 900° C., it is difficult to determine the amount of all nitrogen in $BaAl_2O_{4-x}N_yH_z$, but an approximate content was estimated to be a composition of $BaAl_2O_{3.7}N_{0.17}H_{0.09}$.

[Loading Ru on $BaAl_2O_{4-x}N_yH_z$]

0.50 g of the powdered $BaAl_2O_{4-x}N_yH_z$ synthesized in the present example and 0.056 g of $Ru_3(CO)_{12}$ (made by Aldrich, 99%) (equivalent to 5% by mass of the supported metal Ru with respect to $Ba_3SiO_{5-x}N_yH_z$) were inserted into a silica glass tube, heated at 70° C. for 1 hour in vacuum, and then heated at 120° C. for 1 hour to adhere $Ru_3(CO)_{12}$ on the surface of powdered $BaAl_2O_{4-x}N_yH_z$. Finally, the powdered material thus obtained was heated at 250° C. for 2 hours, and $Ru_3(CO)_{12}$ was pyrolyzed to obtain a supported material in which Ru was fixed to $BaAl_2O_{4-x}N_yH_z$ (hereinafter, referred to as Ru/$BaAl_2O_{4-x}N_yH_z$).

Ammonia synthesis was performed using the ammonia synthesis catalyst.

[Ammonia Synthesis Using Ru-Supported $BaAl_2O_{4-x}N_yH_z$]

<Ammonia Synthesis Reaction>

The above Ru/$BaAl_2O_{4-x}N_yH_z$ was used as a catalyst, and the catalyst was brought into contact with a mixed gas of nitrogen and hydrogen to carry out an ammonia synthesis reaction. 0.1 g of Ru/$BaAl_2O_{4-x}N_yH_z$ was packed in a reaction tube made of SUS, and the reaction was carried out using a fixed bed flow reactor equipped with the reaction tube. The water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 300° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The formation rate of ammonia produced by ammonia synthesis reaction was measured by ion chromatography over time, and Ru/$BaAl_2O_{4-x}N_yH_z$ showed much higher catalytic activity than an existing Ru catalyst of Cs—Ru/MgO, under all reaction temperature conditions (shown in FIG. 3). The ammonia formation rate at 300° C. was 8.4 mmol/g·h. This value is much higher than Cs—Ru/MgO (0.55 mmol/g·h). The results are shown in Table 1.

Example 2

(Preparation of Ammonia Synthesis Catalyst)

[Synthesis of $Ba_3SiO_{5-x}N_yH_z$ Powder]

Dehydrated $SiO_2$ was obtained by removing water and the like adsorbed on the surface of the $SiO_2$ by vacuum heating treatment of $SiO_2$ at 600° C., and the obtained dehydrated $SiO_2$ and $Ba(NH_2)_2$ were mixed using an agate mortar in an Ar glove box. At this time, the mixture was mixed so that the molar ratio of Ba to Si was 3:1. The obtained powder was heated to 600° C. for 2 hours and subjected to heating treatment at 600° C. for 6 hours in an $NH_3$ stream having a flow rate of 100 mL/min to obtain $Ba_3SiO_{5-x}N_yH_z$ powder.

[Loading Ru on $Ba_3SiO_{5-x}N_yH_z$]

0.50 g of powdered $Ba_3SiO_{5-x}N_yH_z$ obtained by the above method and 0.056 g of $Ru_3(CO)_{12}$ (made by Aldrich, 99%) (equivalent to 5% by mass of the supported metal Ru with respect to $Ba_3SiO_{5-x}N_yH_z$) were inserted into a silica glass tube, heated at 70° C. for 1 hour in vacuum, and then heated at 120° C. for 1 hour to adhere $Ru_3(CO)_{12}$ on the surface of powdered $Ba_3SiO_{5-x}N_yH_z$. Finally, the powdered material thus obtained was heated at 250° C. for 2 hours, and $Ru_3(CO)_{12}$ was pyrolyzed to obtain a supported material in which Ru was fixed to $Ba_3SiO_{5-x}N_yH_z$ (hereinafter, referred to as Ru/$Ba_3SiO_{5-x}N_yH_z$).

Ammonia synthesis was performed using the ammonia synthesis catalyst.

[Ammonia Synthesis Using Ru-Supported $Ba_3SiO_{5-x}N_yH_z$]
<Ammonia Synthesis Reaction>

The above $Ru/Ba_3SiO_{5-x}N_yH_z$ was used as a catalyst, and the catalyst was brought into contact with a mixed gas of nitrogen and hydrogen to carry out an ammonia synthesis reaction. 0.1 g of $Ru/Ba_3SiO_{5-x}N_yH_z$ was packed in a reaction tube made of SUS, and the reaction was carried out using a fixed bed flow reactor equipped with the reaction tube. The water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 300° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The formation rate of ammonia produced by ammonia synthesis reaction was measured by ion chromatography. The ammonia formation rate at 300° C. and 0.9 MPa was 6.34 mmol/g·hr as shown in Table 1. The results are shown in Table 1.

Figure 3:
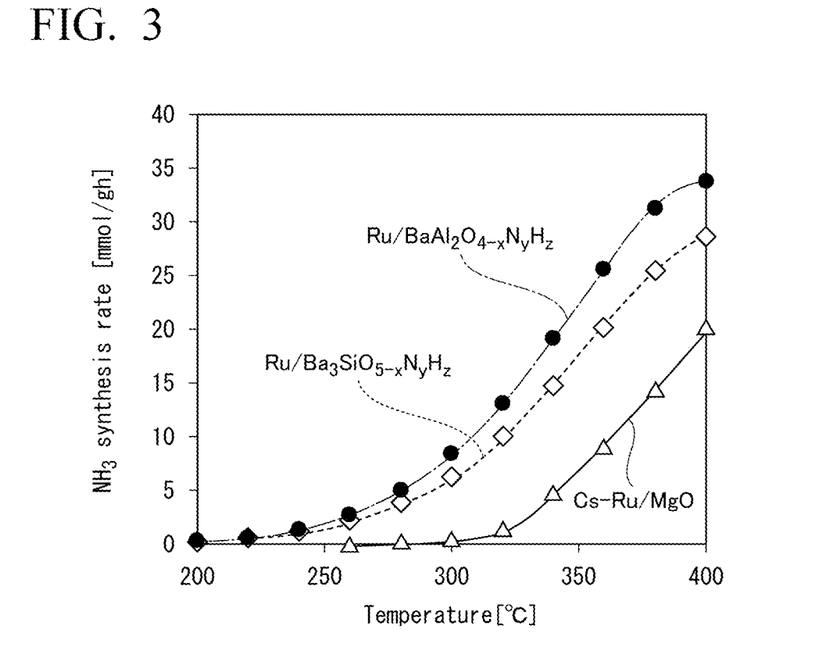
FIG. 3 is a graph showing the reaction temperature dependence of each ammonia synthesis rate in Examples 1 and 2 and Comparative Example 1.

The reaction temperature of the ammonia synthesis reaction was changed to evaluate the reaction temperature dependence of the ammonia formation rate. The results are shown in FIG. 3.

Comparative Example 1

[Synthesis of Cs—Ru/MgO Powder]

A 5% by mass Ru—Cs/MgO catalyst (Cs/Ru element ratio=1) was prepared by the same method as in Example 1, except that MgO in which Cs was added (hereinafter, referred to as Cs/MgO) was used instead of $BaAl_2O_{4-x}N_yH_z$ in Example 1.

[Ammonia Synthesis Using Cs—Ru/MgO]
<Ammonia Synthesis Reaction>

The ammonia synthesis reaction was carried out under the same conditions as in Example 1. The ammonia formation rate at 300° C. and 0.9 MPa was 0.55 mmol/g·hr as shown in Table 1. The results are shown in Table 1.

Comparative Example 2

[Synthesis of $Ru/CeO_2$ Powder]

A 5% by mass $Ru/CeO_2$ catalyst was prepared by the same method as in Example 1 except that $CeO_2$ was used instead of $BaAl_2O_{4-x}N_yH_z$ in Example 1.

[Ammonia Synthesis Using $Ru/CeO_2$]
<Ammonia Synthesis Reaction>

The ammonia synthesis reaction was carried out under the same conditions as in Example 1. The ammonia formation rate at 300° C. and 0.9 MPa was 0.72 mmol/g·hr as shown in Table 1. The results are shown in Table 1.

Comparative Example 3

[Synthesis of Ru/C12A7: e⁻ Powder]

A 2% by mass Ru/C12A7: e⁻ catalyst was prepared in the same manner as described in WO 2012/0077658, instead of using $BaAl_2O_{4-x}N_yH_z$ in Example 1.

[Ammonia Synthesis Using Ru/C12A7: e⁻]
<Ammonia Synthesis Reaction>

The ammonia synthesis reaction was carried out under the same conditions as in Example 1. The ammonia formation rate at 300° C. and 0.9 MPa was 0.76 mmol/g·hr as shown in Table 1. The results are shown in Table 1.

Comparative Example 4

[Synthesis of $Ca_2NH$ Powder]

A 5% by mass $Ru/Ca_2NH$ catalyst was prepared in the same manner as described in WO 2015/129471, instead of using $BaAl_2O_{4-x}N_yH_z$ in Example 1.

[Synthesis of Ammonia Using $Ru/Ca_2NH$]
<Ammonia Synthesis Reaction>

The ammonia synthesis reaction was carried out under the same conditions as in Example 1. The ammonia formation rate at 300° C. and 0.9 MPa was 1.74 mmol/g·hr as shown in Table 1. The results are shown in Table 1.

<XRD of $BaAl_2O_{4-x}N_yH_z$ Powder>

FIG. 1 shows the XRD pattern of the sample synthesized in Example 1 by the method described above. The XRD patterns of $Al_2O_3$, BaO, and $BaAl_2O_4$ are also shown in FIG. 1 for comparison.

Examples 3 to 5

[Evaluation of $Ba_3SiO_{5-x}N_yH_z$ Powders Synthesized at Various Heating Temperatures]

$Ba_3SiO_{5-x}N_yH_z$ powders were prepared by the same method as in Example 1 except that the heat treatment temperatures in the $NH_3$ stream of Example 1 were changed from 600° C. to the heat treatment temperatures shown in Table 2.

<XRD of $Ba_3SiO_{5-x}N_yH_z$ Powder>

Figure 4:
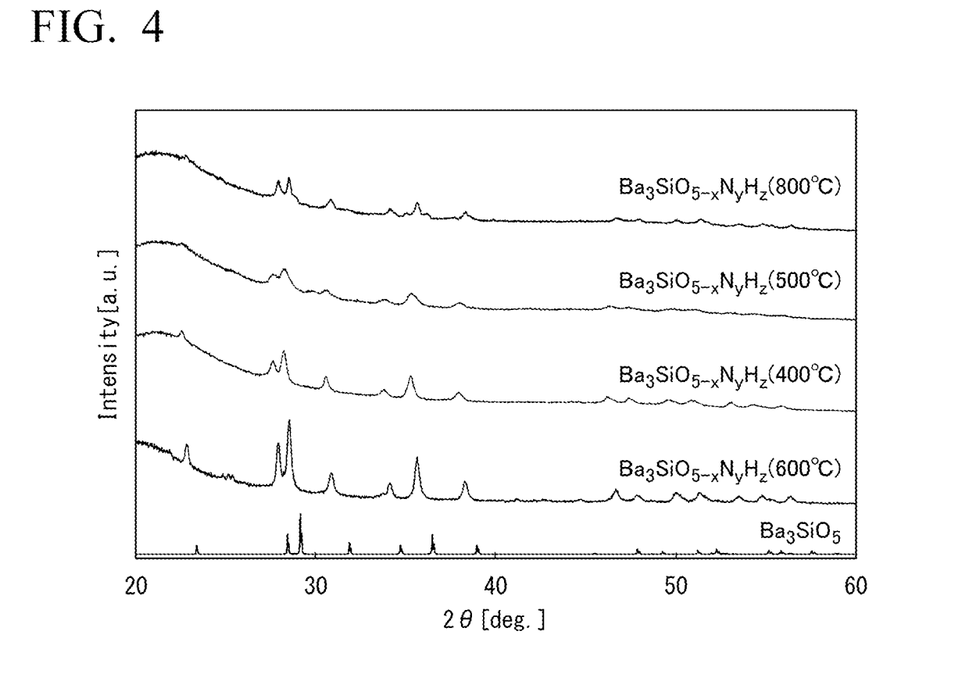
FIG. 4 is XRD patterns of oxynitride-hydride $Ba_3SiO_{5-x}N_yH_z$ powders synthesized in Examples 2 and 3 to 5 at various heat treatment temperatures and treatment times as powder processing conditions.

FIG. 4 shows XRD patterns of samples synthesized by the above-described methods at various heat treatment temperatures. The XRD pattern of $Ba_3SiO_5$ is also shown in FIG. 4 for comparison.

As shown in FIG. 4, when the heat treatment temperature was 400° C. or higher, the presence of a $Ba_3SiO_5$ crystal phase was confirmed, and a material of substantially a single phase was obtained. The presence of a $Ba_3SiO_5$ crystalline phase was also confirmed when the heat treatment temperature was raised to 800° C. In addition, it was confirmed that the peak shifted to the lower angle side overall compared with the standard oxide $Ba_3SiO_5$. It is considered that this was because nitrogen having a larger ionic radius than oxygen was doped at a higher concentration.

TABLE 1

| Catalyst | | Specific Surface Area (m²/g) | Catalytic Activity (NH₃ Formation Rate) (mmol/g/h) |
|---|---|---|---|
| Example 1 | 5% by mass $Ru/BaAl_2O_{4-x}N_yH_z$ | 1.2 | 8.4 |
| Example 2 | 5% by mass $Ru/Ba_3SiO_{5-x}N_yH_z$ | 3.4 | 6.34 |
| Comparative Example 1 | 5% by mass Cs—Ru/MgO | 32 | 0.55 |
| Comparative Example 2 | 5% by mass $Ru/CeO_2$ | 46 | 0.72 |
| Comparative Example 3 | 2% by mass Ru/C12A7: e⁻ | 1 | 0.76 |
| Comparative Example 4 | 5% by mass $Ru/Ca_2NH$ | 1.5 | 1.74 |

The reaction conditions of the examples and comparative examples in Table 1 are as follows.

Catalyst amount: 0.1 g, reaction temperature: 300° C., reaction gas flow rate: 60 mL/min; Reaction gas composition: $N_2/H_2=1/3$ (v/v), reaction pressure: 0.9 MPa.

TABLE 2

| | $Ba_3SiO_{5-x}N_yH_z$ Powder | Heat Treatment Temperature (° C.) |
|---|---|---|
| Example 2 | $Ba_3SiO_{5-x}N_yH_z$ | 600 |
| Example 3 | | 400 |
| Example 4 | | 500 |
| Example 5 | | 800 |

Example 6

[Loading Co on $BaAl_2O_{4-x}N_yH_z$]

0.855 g of powdered $BaAl_2O_{4-x}N_yH_z$ synthesized in Example 1 and 0.145 g of $Co_2(CO)_8$ (made by Kanto Kagaku Co., Ltd. 95%) (equivalent to 5% by mass of the supported metal Co with respect to $Ba_3SiO_{5-x}N_yH_z$) were put into a quartz glass reaction tube, nitrogen 15 mL/min and hydrogen 45 mL/min were passed through the tube, and the temperature was raised to 400° C. for 2 hours and maintained for 5 hours to obtain a supported material in which Co was fixed to $BaAl_2O_{4-x}N_yH_z$ (hereinafter, referred to as $Co/BaAl_2O_{4-x}N_yH_z$).

Ammonia synthesis was performed using the ammonia synthesis catalyst.

[Ammonia Synthesis Using Co-Supported $BaAl_2O_{4-x}N_yH_z$]
<Ammonia Synthesis Reaction>

The above $Co/BaAl_2O_{4-x}N_yH_z$ was used as a catalyst, and the catalyst was brought into contact with a mixed gas of nitrogen and hydrogen to carry out an ammonia synthesis reaction. 0.1 g of $Co/BaAl_2O_{4-x}N_yH_z$ was packed in a reaction tube made of SUS, and the reaction was carried out using a fixed bed flow reactor equipped with the reaction tube. The water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 300° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The time-dependent formation rates of ammonia produced by ammonia synthesis reaction were measured by ion chromatography. The ammonia formation rate at 300° C. and 0.9 MPa was 1.11 mmol/g·hr as shown in Table 3. The results are shown in Table 3.

Example 7

(Preparation of Ammonia Synthesis Catalyst)
[Loading Co on $Ba_3SiO_{5-x}N_yH_z$]

The powdered $Ba_3SiO_{5-x}N_yH_z$ obtained in Example 2 and $Co_2(CO)_8$ (made by Kanto Kagaku Co., Ltd. 95%) (equivalent to 5% by mass of the supported metal Co with respect to $Ba_3SiO_{5-x}N_yH_z$) are placed in a quartz glass reaction tube, nitrogen 15 mL/min and hydrogen 45 mL/min are passed through the tube, and the temperature is raised to 400° C. for 2 hours and maintained for 5 hours to obtain a supported material in which Co is fixed to $Ba_3SiO_{5-x}N_yH_z$ (hereinafter, referred to as $Co/Ba_3SiO_{5-x}N_yH_z$).

Ammonia synthesis is performed using the ammonia synthesis catalyst.

[Ammonia Synthesis Using Co-Supported $Ba_3SiO_{5-x}N_yH_z$]
<Ammonia Synthesis Reaction>

The $Co/Ba_3SiO_{5-x}N_yH_z$ is used as a catalyst, and the catalyst is brought into contact with a mixed gas of nitrogen and hydrogen to carry out an ammonia synthesis reaction. The reaction is carried out by packing 0.1 g of $Co/Ba_3SiO_{5-x}N_yH_z$ in a reaction tube made of SUS and using a fixed bed flow reactor equipped with the reaction tube. It is confirmed that the water content of the raw material nitrogen gas and the water content of the hydrogen gas are below the detection limits, respectively. The flow rate of the raw material gas during the reaction is 15 mL/min for nitrogen gas and 45 mL/min for hydrogen gas (total 60 mL/min). The reaction pressure is 0.9 MPa, the reaction temperature is 300° C., and the reaction time is 30 hours.

<Ammonia Formation Rate>

The gas coming out of the fixed bed flow type reactor is bubbled into a 0.005 M sulfuric acid aqueous solution, ammonia in the gas is dissolved, and the generated ammonium ion is determined by the method using an ion chromatograph. The formation rate of ammonia produced by the ammonia synthesis reaction is measured by an ion chromatograph over time. The ammonia synthesis rate (mmol/g·hr) at 300° C. and 0.9 MPa is calculated.

Example 8

[Loading Fe on $BaAl_2O_{4-x}N_yH_z$]

The powdered $BaAl_2O_{4-x}N_yH_z$ synthesized in Example 1 and $Fe_2(CO)_2$ (made by STREM CHEMICALS, 99%) (equivalent to 5% by mass of the supported metal Fe with respect to $Ba_3SiO_{5-x}N_yH_z$) are placed in a quartz glass tube, nitrogen 15 mL/min and hydrogen 45 mL/min are passed through the tube, and the temperature is raised to 400° C. for 2 hours and maintained for 5 hours to obtain a supported material in which Fe is fixed to $BaAl_2O_{4-x}N_yH_z$ (hereinafter, referred to as $Fe/BaAl_2O_{4-x}N_yH_z$).

Ammonia synthesis is performed using the ammonia synthesis catalyst.

Ammonia Synthesis Using Fe-Supported $BaAl_2O_{4-x}N_yH_z$
<Ammonia Synthesis Reaction>

The above $Fe/BaAl_2O_{4-x}N_yH_z$ is used as a catalyst, and the catalyst is brought into contact with a mixed gas of nitrogen and hydrogen to perform ammonia synthesis reaction. The reaction is carried out by packing 0.1 g of $Fe/BaAl_2O_{4-x}N_yH_z$ in a reaction tube made of SUS and using a fixed bed flow reactor equipped with the reaction tube. It was confirmed that the water content of the nitrogen gas and the water content of the hydrogen gas in the raw material are below the detection limits, respectively. The flow rate of the raw material gas during the reaction is 15 mL/min for nitrogen gas and 45 mL/min for hydrogen gas (total 60 mL/min). The reaction pressure is 0.9 MPa, the reaction temperature is 300° C., and the reaction time is 30 hours.

<Ammonia Formation Rate>

The gas coming out of the fixed bed flow type reactor is bubbled into a 0.005 M sulfuric acid aqueous solution, ammonia in the gas is dissolved, and the generated ammonium ion is determined by the method using an ion chromatograph. The formation rate of ammonia produced by the ammonia synthesis reaction is measured by an ion chro-

Example 9

(Preparation of Ammonia Synthesis Catalyst)
[Loading Fe on $Ba_3SiO_{5-x}N_yH_z$]

0.837 g of powdered $Ba_3SiO_{5-x}N_yH_z$ obtained in Example 2 and 0.163 g of $Fe_2(CO)_9$ (made by STREM CHEMICALS, 99%) (equivalent to 5% by mass of supported metal Fe with respect to $Ba_3SiO_{5-x}N_yH_z$) were put into a quartz glass reaction tube, which was circulated with 15 mL/min of nitrogen and 45 mL/min of hydrogen, and the tube was heated to 400° C. for 2 hours and maintained for 5 hours to obtain a supported material in which Fe was fixed to $Ba_3SiO_{5-x}N_yH_z$ (hereinafter, referred to as $Fe/Ba_3SiO_{5-x}N_yH_z$).

Ammonia synthesis was performed using the ammonia synthesis catalyst.

[Ammonia Synthesis Using Fe-Supported $Ba_3SiO_{5-x}N_yH_z$]
<Ammonia Synthesis Reaction>

The above $Fe/Ba_3SiO_{5-x}N_yH_z$ was used as a catalyst, and the catalyst was brought into contact with a mixed gas of nitrogen and hydrogen to carry out an ammonia synthesis reaction. 0.1 g of $Fe/Ba_3SiO_{5-x}N_yH_z$ was packed in a reaction tube made of SUS, and the reaction was carried out using a fixed bed flow reactor equipped with the reaction tube. It was confirmed that the water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 300° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The formation rate of ammonia produced by ammonia synthesis reaction was measured by ion chromatography. The ammonia formation rate at 300° C. and 0.9 MPa was 0.916 mmol/g·hr as shown in Table 1. The results are shown in Table 1.

Example 10

[Loading Ni on $BaAl_2O_{4-x}N_yH_z$]

0.839 g of powdered $BaAl_2O_{4-x}N_yH_z$ synthesized in Example 1 and 0.161 g of $Ni(C_5H_5)_2$ (made by Tokyo Kasei, 98%) (equivalent to 5% by mass of supported metal Ni with respect to $BaAl_2O_{4-x}N_yH_z$) were put into a quartz glass reaction tube, nitrogen 15 mL/min and hydrogen 45 mL/min were passed through the tube, and the tube was heated to 400° C. for 2 hours and maintained for 5 hours to obtain a supported material in which Ni was fixed to $BaAl_2O_{4-x}N_yH_z$ (hereinafter, referred to as $Ni/BaAl_2O_{4-x}N_yH_z$).

Ammonia synthesis was performed using the ammonia synthesis catalyst.

[Ammonia Synthesis Using Ni-Supported $BaAl_2O_{4-x}N_yH_z$]
<Ammonia Synthesis Reaction>

The obtained $Ni/BaAl_2O_{4-x}N_yH_z$ was used as a catalyst, the catalyst was brought into contact with a mixed gas of nitrogen and hydrogen, and ammonia synthesis reaction was carried out. 0.1 g of $Ni/BaAl_2O_{4-x}N_yH_z$ was packed in a reaction tube made of SUS, and the reaction was carried out using a fixed bed flow reactor equipped with the reaction tube. It was confirmed that the water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 400° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The formation rate of ammonia produced by ammonia synthesis reaction was measured by ion chromatography. The ammonia formation rate at 400° C. and 0.9 MPa was 1.20 mmol/g·hr as shown in Table 3. The results are shown in Table 3.

Example 11

(Preparation of Ammonia Synthesis Catalyst)
[Loading Ni on $Ba_3SiO_{5-x}N_yH_z$]

0.839 g of powdered $Ba_3SiO_{5-x}N_yH_z$ obtained in Example 2 and 0.161 g of $Ni(C_5H_5)_2$ (made by Tokyo Kasei, 98%) (equivalent to 5% by mass of supported metal Ni with respect to $Ba_3SiO_{5-x}N_yH_z$) were placed in a quartz glass reaction tube, nitrogen 15 mL/min and hydrogen 45 mL/min were passed through the tube, and the tube was heated to 400° C. for 2 hours and maintained for 5 hours, thereby obtaining a supported material in which Ni was fixed to $Ba_3SiO_{5-x}N_yH_z$ (hereinafter, referred to as $Ni/Ba_3SiO_{5-x}N_yH_z$).

Ammonia synthesis was performed using the ammonia synthesis catalyst.

[Ammonia Synthesis Using Ni-Supported $Ba_3SiO_{5-x}N_yH_z$]
<Ammonia Synthesis Reaction>

The obtained $Ni/Ba_3SiO_{5-x}N_yH_z$ was used as a catalyst, and the catalyst was brought into contact with a mixed gas of nitrogen and hydrogen to carry out an ammonia synthesis reaction. 0.1 g of $Ni/Ba_3SiO_{5-x}N_yH_z$ was packed in a reaction tube made of SUS, and the reaction was carried out using a fixed bed flow reactor equipped with the reaction tube. It was confirmed that the water content of nitrogen gas and the water content of hydrogen gas were below the detection limits, respectively. The flow rate of the raw material gas during the reaction was 15 mL/min for nitrogen gas and 45 mL/min for hydrogen gas (total 60 mL/min). The reaction pressure was 0.9 MPa, the reaction temperature was 400° C., and the reaction time was 30 hours.

<Ammonia Formation Rate>

The gas coming out of the fixed bed flow reactor was bubbled into a 0.005 M sulfuric acid aqueous solution, ammonia in the gas was dissolved, and the resulting ammonium ion was determined by the above method using an ion chromatograph. The formation rate of ammonia produced by ammonia synthesis reaction was measured by ion chromatography. The formation rate of ammonia at 400° C. and 0.9 MPa was 0.282 mmol/g·hr as shown in Table 1. The results are shown in Table 1.

TABLE 3

| Catalyst | | Catalytic Activity (NH₃ Formation Rate) (mmol/g/h) |
|---|---|---|
| Example 6 | 5% by mass Co/BaAl₂O₄₋ₓNᵧH_z | 1.11 |
| Example 9 | 5% by mass Fe/Ba₃SiO₅₋ₓNᵧH_z | 0.916 |
| Comparative Example 10 | 5% by mass Ni/BaAl₂O₄₋ₓNᵧH_z | 1.2 |
| Comparative Example 11 | 5% by mass Ni/Ba₃SiO₅₋ₓNᵧH_z | 0.282 |

The reaction conditions of Examples 6 and 9 in Table 3 are shown as follows.

Catalyst amount: 0.1 g, reaction temperature: 300° C., reaction gas flow rate: 60 mL/min;

Reaction gas composition: $N_2/H_2=1/3$ (v/v), reaction pressure: 0.9 MPa.

The reaction conditions of Examples 10 and 11 in Table 3 are shown as follows.

Catalyst amount: 0.1 g, reaction temperature: 400° C., reaction gas flow rate: 60 mL/min;

Reaction gas composition: $N_2/H_2=1/3$ (v/v), reaction pressure: 0.9 MPa.

The effect of the ammonia synthesis catalyst of the present invention is that, unlike a general method of synthesizing an oxynitride-hydride in which the oxygen site is replaced with nitrogen or hydrogen after synthesizing a complex oxide, an oxynitride-hydride can be synthesized in one step at a low temperature by using a metal amide material containing an A-site element of an $A_nB_mO_l$ type complex oxide and a transition metal oxide containing a B-site element as raw materials.

In addition, in a catalyst in which nanoparticles of a transition metal such as Ru and the like are fixed on a general oxide, dissociation of nitrogen molecules and hydrogen molecules occurs on the transition metal nanoparticles in the same manner as that in a usual ammonia synthesis catalyst, and the reaction proceeds by means of the Langmuir-Hinshelwood reaction mechanism for synthesizing ammonia. However, in the catalyst of the present invention, ammonia synthesis proceeds by means of the Mars-van Krevelen mechanism in which nitrogen and hydrogen doped in the backbone of the support material are directly involved in the reaction, and the reaction shows high catalytic activity even in the low temperature region. As a result, the activation energy for ammonia synthesis using the catalyst of the present invention is about half that of the conventional catalyst.

The invention claimed is:

1. An oxynitride-hydride, which is represented by the following general formula (1), $$A_nB_mO_{l-x}N_yH_z \quad (1)$$

wherein, in the general formula (1), A is at least one selected from the group consisting of Ba and Sr; B is at least one selected from the group consisting of Al, Ga, In, Si, and Ge; n is an integer of 1 to 3; m is 1 or 2; l is 4 or 5; x represents a number represented by $0.1 \leq x \leq 3.5$; y represents a number represented by $0.1 \leq y \leq 2.0$; and z represents a number represented by $0.1 \leq z \leq 2.0$.

2. The oxynitride-hydride according to claim 1, wherein, in the general formula (1), B is at least one selected from the group consisting of Al, Ga, and In; n=1; m=2; and l=4.

3. The oxynitride-hydride according to claim 1, wherein, in the general formula (1), B is at least one selected from the group consisting of Si, and Ge; n=3; m=1; and l=5.

4. A method of producing an oxynitride-hydride represented by the following general formula (1), comprising:

a step of heating a compound represented by the following general formula (2) and a compound represented by the following general formula (3) under an ammonia atmosphere, $$A_nB_mO_{l-x}N_yH_z \quad (1)$$

$$A(NH_2)_2 \quad (2)$$

$$B_kO_j \quad (3)$$

wherein, in the general formulae (1) to (3), A is at least one selected from the group consisting of Ba and Sr; B is at least one selected from the group consisting of Al, Ga, In, Si, and Ge; n is an integer of 1 to 3; m is 1 or 2; l is 4 or 5; k is 1 or 2; j is 1 to 3; x represents a number represented by $0.1 \leq x \leq 3.5$; y represents a number represented by $0.1 \leq y \leq 2.0$; and z represents a number represented by $0.1 \leq z \leq 2.0$.

5. The method of producing the oxynitride-hydride according to claim 4, wherein, in the general formula (1), B is at least one selected from the group consisting of Al, Ga, and In; n=1; m=2; and l=4.

6. The method of producing the oxynitride-hydride according to claim 4, wherein, in the general formula (1), B is at least one selected from the group consisting of Si, and Ge; n=3; m=1; and l=5.

7. A metal-supported material in which a transition metal (M) is supported on a support, wherein the support is a composition comprising an oxynitride-hydride which is represented by the following general formula (1), $$A_nB_mO_{l-x}N_yH_z \quad (1)$$

wherein, in the general formula (1), A is at least one selected from the group consisting of Ba and Sr; B is at least one selected from the group consisting of Al, Ga, In, Si, and Ge; n is an integer of 1 to 3; m is 1 or 2; l is 4 or 5; x represents a number represented by $0.1 \leq x \leq 3.5$; y represents a number represented by $0.1 \leq y \leq 2.0$; and z represents a number represented by $0.1 \leq z \leq 2.0$.

8. The metal-supported material according to claim 7, wherein a loading amount of the transition metal (M) is 0.01 parts by mass to 50 parts by mass with respect to 100 parts by mass of the support.

9. The metal-supported material according to claim 7, wherein the transition metal (M) is at least one selected from the group consisting of Ru, Co, and Fe.

10. A supported-metal catalyst comprising the metal-supported material according to claim 7.

11. An ammonia synthesis catalyst comprising the metal-supported material according to claim 7.

12. An ammonia synthesis catalyst, which is a composition comprising an oxynitride-hydride which is represented by the following general formula (1), $$A_nB_mO_{l-x}N_yH_z \quad (1)$$

wherein, in the general formula (1), A is at least one selected from the group consisting of Ba and Sr; B is at least one selected from the group consisting of Al, Ga, In, Si, and Ge; n is an integer of 1 to 3; m is 1 or 2; l is 4 or 5; x represents a number represented by $0.1 \leq x \leq 3.5$; y represents a number represented by $0.1 \leq y \leq 2.0$; and z represents a number represented by $0.1 \leq z \leq 2.0$.

13. The metal-supported material according to claim 7, wherein, in the general formula (1), B is at least one selected from the group consisting of Al, Ga, and In; n=1; m=2; and l=4.

14. The metal-supported material according to claim 7, wherein, in the general formula (1), B is at least one selected from the group consisting of Si, and Ge; n=3; m=1; and l=5.

15. A method of producing the metal-supported material according to claim 7, comprising:

a step of producing the oxynitride-hydride represented by the general formula (1) by heating a compound represented by the following general formula (2) and a compound represented by the following general formula (3) under an ammonia atmosphere, $$A(NH_2)_2 \quad (2)$$

$$B_kO_j \quad (3)$$

wherein, in the general formulae (2) to (3), A is at least one selected from the group consisting of Ba and Sr; B is at least one selected from the group consisting of Al, Ga, In, Si, and Ge; k is 1 or 2; j is 1 to 3; and a step of loading the transition metal (M) on the oxynitride-hydride.

16. The method of producing the metal-supported material according to claim 15, wherein, in the general formula (1), B is at least one selected from the group consisting of Al, Ga, and In; n=1; m=2; and l=4.

17. The method of producing the metal-supported material according to claim 15, wherein, in the general formula (1), B is at least one selected from the group consisting of Si, and Ge; n=3; m=1; and l=5.

\* \* \* \* \*